United States Patent

[11] 3,569,929

| [72] | Inventor | Gene S. Wood |
| | | Project City, Calif. |
| [21] | Appl. No. | 722,742 |
| [22] | Filed | Apr. 19, 1968 |
| [45] | Patented | Mar. 9, 1971 |
| [73] | Assignee | Alvin M. Cibula and Franklin S. Cibula, Reading, Calif., fractional part interest to each. |

[54] TRANSIENT VOLTAGE DETECTOR BURGLAR ALARM SYSTEM FOR VEHICLES
7 Claims, 2 Drawing Figs.

[52] U.S. Cl. .................................................. 340/63,
307/10, 340/276
[51] Int. Cl. .................................................. G08b 13/00,
B60r 25/00
[50] Field of Search .......................................... 340/63, 64,
248 (B)(C), 249, 276; 323/22; 317/50

[56] References Cited
UNITED STATES PATENTS
2,994,073  7/1961  Pelovitz ........................ 340/63

3,417,312  12/1968  Someda ........................ 321/18
3,422,398  1/1969  Rubin ........................ 340/276

*Primary Examiner*—Donald J. Yusko
*Assistant Examiner*—R. J. Mooney
*Attorney*—Berman, Davidson and Berman ABSTRACT: An alarm device to be connected across the battery of a motor vehicle to respond to transient voltage changes caused by electrical loading of the battery such as would be caused by energization of the vehicle door lights, brake light, or the like, and to thereby cause the vehicle horn to be energized. The device has an input circuit including the primary of a transformer. The secondary of the transformer is connected to the gate and cathode of a normally nonconducting silicon-controlled rectifier whose anode and cathode are connected in an energizing circuit containing the vehicle horn relay. The silicon-controlled rectifier is turned on in response to a transient voltage change detected by the transformer primary, thereby energizing the horn relay.

Patented March 9, 1971

3,569,929

INVENTOR.
GENE S. WOOD,
BY
Berman, Davidson & Berman
ATTORNEYS.

TRANSIENT VOLTAGE DETECTOR BURGLAR ALARM SYSTEM FOR VEHICLES

This invention relates to transient voltage detection systems, and more particularly to an alarm device to be employed on a motor vehicle for detecting transient voltage changes caused by electrical loading of the battery of the vehicle, so as to function as a burglar alarm system.

A main object of the invention is to provide a novel and improved burglar alarm system for a motor vehicle arranged so as to energize the vehicle horn, or some equivalent warning device on the vehicle when the vehicle battery experiences a load, such as the energization of the courtesy light in the vehicle, the energization of the brake light, or the like, which will occur when the vehicle is entered by some unauthorized person, the alarm device involving very simple components, being easy to install, and being highly sensitive.

A further object of the invention is to provide an improved motor vehicle burglar alarm system which responds to transient voltage changes occuring across the motor vehicle battery as a result of loading the battery, the alarm device being very inexpensive to manufacture, being durable in construction, being very compact in size, and normally imposing substantially no current drain on the vehicle battery.

A still further object of the invention is to provide an improved voltage change detector adapted to be employed in conjunction with a vehicle battery so as to detect sudden loads applied to the battery, such as would occur when the vehicle courtesy light is turned on responsive to the opening of a door of the vehicle, the vehicle brake light is turned on, or off, or any other electrical action causing loading of the battery incident to an attempted burglary of the associated vehicle, the device being easy to set for use and to reset after it has served its purpose, being substantially self-contained and compact so that it can be easily installed in an inconspicuous location in a motor vehicle, and being provided with built-in protective means to prevent damage to its components.

Further objects and advantages of the invention will become apparent from the following description and claims, and from the accompanying drawing, wherein:

Due to the fact that a battery has internal resistance, the voltage thereacross will change responsive to the flow of current from the battery, even if a relatively small current flow takes place. Thus, the voltage across an automobile battery will change slightly whenever the battery experiences a current drain, for example, when any lamp associated with the vehicle in which the battery is installed is turned on. For example, the voltage across the vehicle battery will drop slightly when a vehicle door is opened, causing the associated door switch to close and energize the vehicle courtesy light. Similarly, a voltage change will occur across the terminals of the battery when the brake light of the vehicle is turned on, or off, or when the ignition circuit of the vehicle is closed. A prime purpose of the present invention is to provide a means, preferably of a normally nondissipative nature, which will sense the change in voltage which occurs across a vehicle battery when such a current drain takes place, and will respond thereto to automatically turn on a warning device, for example, the horn associated with the vehicle. The invention, therefore, contemplates the use of voltage-sensitive means of a type which does not ordinarily draw current connected across the vehicle battery and arranged to develop an output signal responsive to a transient change in the voltage of the battery and to use this signal to trigger a switch device, for example, an electronic switch device, connected in the energizing circuit of a suitable warning device, for example, connected in the circuit of the control relay associated with the motor vehicle horn. As will be readily apparent from the description to follow, any suitable voltage-sensitive means may be employed, for example, a voltage-sensitive impedance device such as an auto transformer or a conventional step-up transformer in conjunction with suitable blocking means to prevent normal flow of direct current to the input circuit of the voltage-sensitive means. Any suitable switch device or circuit may be employed in the output circuit, for example, a silicon-controlled rectifier may be triggered in response to the output signal delivered by the voltage-sensitive portion of the system. The switch device, namely, a silicon-controlled rectifier, or its equivalent, is connected in circuit with the horn relay, but is normally in a nonconducting state.

Figure 1:
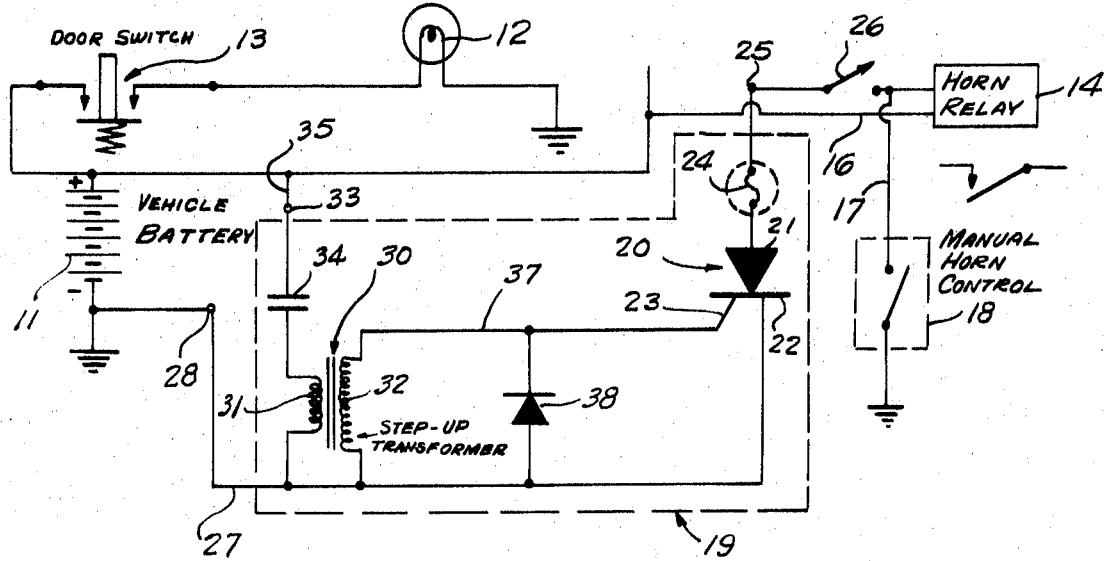
FIG. 1 is a wiring diagram showing the electrical connections of a typical alarm device constructed in accordance with the present invention connected to the battery and some other elements of a motor vehicle in which the device is installed.

Referring to the drawing, and particularly to FIG. 1, 11 designates a typical motor vehicle battery employed on a vehicle and having one grounded terminal, for example, having its negative terminal grounded, as shown, and having its positive terminal connected to the various conventional motor vehicle circuits, such as to the circuits containing the vehicle headlights and other similar lamps, such as the vehicle courtesy light 12 shown, by way of example, in FIG. 1. The vehicle courtesy lamp 12 is connected in a conventional manner between the vehicle ground and the positive terminal of the vehicle battery 11 through a door switch 13 which is normally held open when the vehicle door is closed and which closes automatically responsive to the opening of the vehicle door. In FIG. 1 only a single door switch 13 is illustrated, but it will be understood that additional normally open door switches similar to the switch 13 may be employed in parallel connection with the single door switch illustrated, each door switch being associated with a respective vehicle door.

Also illustrated in FIG. 1 is a typical type of connection between the vehicle horn relay, shown at 14, and the vehicle battery 11. The horn relay 14 has one terminal wire 16 connected to the positive terminal of the vehicle battery 11, and has another terminal wire 17 connected through a conventional manually controlled switch device, such as a conventional horn button switch device mounted on the steering column of the vehicle, to the vehicle ground. The conventional manually controlled horn switch is diagrammatically illustrated at 18 in FIG. 1.

Designated generally at 19 is a typical burglar alarm device constructed in accordance with the present invention, shown electrically-connected to the above-described motor vehicle electrical components. The alarm device 19 comprises a normally nonconducting electronic switch, for example, a silicon-controlled rectifier, designated generally at 20, having the anode 21, the cathode 22 and the gate electrode 23. The anode 21 is connected through a conventional protective fuse 24 to a terminal 25. Terminal 25 is connected through a manually controlled switch 26 to the wire 17, the switch 26 being external to the main body of the alarm device, as will be presently described, and being located in any convenient location in, or on the motor vehicle such that it can be operated without the necessity of opening a vehicle door, or otherwise causing a transient voltage change to occur across the vehicle battery 11.

The cathode 22 is connected by a wire 27 to a ground terminal 28 which is, in turn, connected to the vehicle ground. With switch 26 closed, under normal conditions, the silicon-controlled rectifier 20 is nonconducting and the horn relay 14 can only be energized by its manual-control switch 18. However, under these conditions, if a sufficient positive voltage is applied to the gate electrode 23, namely, a voltage which is positive relative to the cathode 22, the silicon-controlled rectifier 20 will be rendered conducting and the ground circuit to the horn relay 14 will be closed, causing the horn relay to become energized and to turn on the vehicle horn.

The alarm device 19 is provided with a voltage change sensitive input device, which, as above-mentioned, may be any suitable voltage change sensitive input impedance, such as an auto transformer, a conventional transformer, or the like. In the specific embodiment illustrated in FIG. 1, a conventional step-up transformer 30 is employed, the transformer 30 having the primary 31 and the secondary 32. The primary 31 is connected between the ground wire 27 and an input terminal 33 through a direct current-blocking capacitor 34. Input terminal 33 is connected by a wire 35 to the positive battery wire 16.

The capacitor 34, in a typical embodiment of the invention, had a capacity of 0.1 microfarad with a voltage rating of 200 volts. In said typical embodiment the transformer 30 was an Argonne-type AR119 transformer. The silicon-controlled rectifier 20 was a General Electric type C611B silicon-controlled rectifier.

One terminal of secondary 32 is connected to the ground wire 27 and the other terminal thereof is connected by a wire 37 to the gate electrode 23. To substantially prevent other than a positive gating pulse from reaching the gate electrode 23, suitable rectifying means is employed in the output circuit. Thus, in the typical embodiment illustrated in FIG. 1 a diode 38 is connected across the secondary 32, polarized to substantially suppress any voltage pulses negative relative to cathode 22. Diode 38 may be any conventional type, for example, a diode having a current rating of 1 ampere at 200 volts.

In operation, when any abrupt change occurs in the voltage across the motor vehicle battery 11, a corresponding pulse of current flows in the circuit branch containing capacitor 34 and primary 31. The current pulse in primary 31 produces a stepped-up voltage pulse across secondary 32, since the transformer 30 is of the step-up type, the step-up ratio being sufficient to produce a voltage pulse on gate electrode 23 which is sufficiently positive with respect to cathode 22 to trigger the silicon-controlled diode 20 and thus energize the horn relay 14. As above-mentioned, the diode 38 connected across secondary 32 is polarized so as to substantially suppress negative pulses which might otherwise appear on the gate electrode 23.

When the silicon-controlled rectifier 20 is triggered, as above-described, it assumes a conducting state and remains conducting until it is disabled by opening its circuit. Thus, when horn relay 14 becomes energized responsive to the conduction of the silicon-controlled rectifier 20, it remains energized until the reset switch 26 is manually opened.

Figure 2:
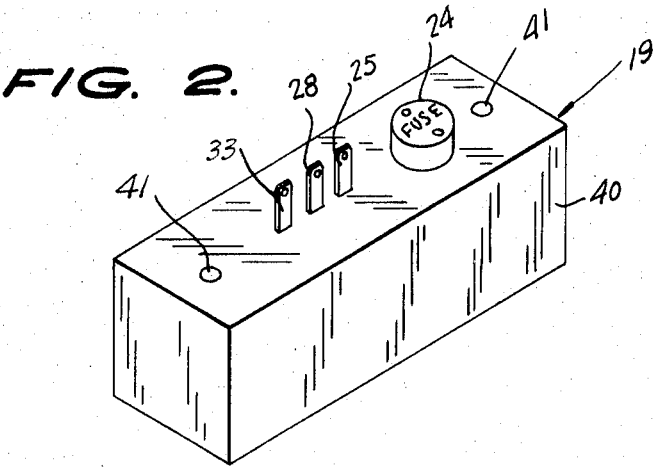
FIG. 2 is a perspective view showing a typical alarm device having the electrical circuit of FIG. 1 and being fabricated as a self-contained unit in accordance with the present invention.

The major parts of the device 19 are preferably embedded in a block 40 of suitable mechanically rigid insulating material, such as resin material, which provides vibration and moisture protection for the components of the device. As shown in FIG. 2, the terminals 25, 28 and 23 are in the form of conventional prongs exposed at one surface of the block 40 and adapted to be engaged by a conventional female plug provided on a cable with wires leading to the required conductors of the vehicle electrical system corresponding to the arrangement of FIG. 1. The block 40 is of relatively small size and provided with mounting holes 41,41 at its opposite ends to receive suitable fasteners for securing the block in any convenient noninterfering location in the motor vehicle.

The fuse 24 has a suitable rating sufficient to protect the silicon-controlled rectifier 20 against the passage of excessive current therethrough.

While a specific embodiment of an improved transient voltage detection system for use as an automobile burglar alarm device has been disclosed in the foregoing description, it will be understood that various modifications within the spirit of the invention may occur to those skilled in the art. Therefore, it is intended that no limitations be placed on the invention except as defined by the scope of the appended claims.

I claim:

1. An alarm device for a motor vehicle having a battery comprising an electrical warning device, a normally nonconductive electronic switch device having a gate electrode, a cathode and an anode, an energizing circuit connecting the anode and cathode of said electronic switch device in circuit with said battery and warning device, voltage change-sensitive means, input circuit means connecting said voltage change-sensitive means across said battery including direct current blocking means having low alternating current impedance, said voltage change-sensitive means having output terminals including means to generate an output voltage across said output terminals responsive to a transient decrease in the terminal voltage of the battery caused by a sudden load on the battery and the internal resistance of the battery, and means connecting the output terminals of said voltage change-sensitive means across the gate electrode and the cathode of the electronic switch device to render the electronic switch device conducting responsive to said transient decrease in battery voltage.

2. The alarm device of claim 1, and wherein said electronic switch device comprises a silicon-controlled rectifier.

3. The alarm device of claim 2, and wherein said voltage change-sensitive means includes a transformer having its primary included in said input circuit means.

4. The alarm device of claim 3, and wherein said direct current blocking means includes a capacitor connected in series with said primary.

5. The alarm device of claim 4, and means to substantially rectify the output of said transformer.

6. The alarm device of claim 5, and wherein said transformer has a secondary winding connected to said output terminals, and said rectifying means comprises a diode connected across the output terminals.

7. The alarm device of claim 6, and wherein said diode is polarized to substantially suppress voltage pulses on the gate electrode which are negative with respect to the cathode.